(12) United States Patent
Ouderkirk

(10) Patent No.: US 11,009,662 B2
(45) Date of Patent: May 18, 2021

(54) MANUFACTURING A GRADED INDEX PROFILE FOR WAVEGUIDE DISPLAY APPLICATIONS

(71) Applicant: Facebook Technologies, LLC, Menlo Park, CA (US)

(72) Inventor: Andrew John Ouderkirk, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/695,466

(22) Filed: Sep. 5, 2017

(65) Prior Publication Data

US 2019/0072718 A1    Mar. 7, 2019

(51) Int. Cl.
*G02B 6/13* (2006.01)
*G02B 6/134* (2006.01)
(Continued)

(52) U.S. Cl.
CPC ...... *G02B 6/1342* (2013.01); *B29D 11/00663* (2013.01); *B29D 11/00682* (2013.01);
(Continued)

(58) Field of Classification Search
CPC .. G02B 6/1342; G02B 6/12028; G02B 6/122; G02B 2006/12095; G02B 2006/12102;
(Continued)

(56) References Cited

U.S. PATENT DOCUMENTS

| 5,048,905 A | * | 9/1991 | Fejer | G02B 6/122 385/122 |
| 5,351,332 A | * | 9/1994 | Cook | G02B 6/06 385/116 |

(Continued)

FOREIGN PATENT DOCUMENTS

| CN | 1217069 | 5/1999 |
| CN | 1275479 | 12/2000 |

(Continued)

OTHER PUBLICATIONS

Song et al., Layered Polymeric Optical Systems Using Continuous Coextrusion, SPIE Review Paper 2009, available at https://pdfs.semanticscholar.org/c690/c63bb523418496a2bca775df16e34462aaef.pdf.*

(Continued)

*Primary Examiner* — Peter Radkowski
(74) *Attorney, Agent, or Firm* — Pequignot + Myers; Matthew A. Pequignot

(57) ABSTRACT

A manufacturing system for fabricating optical waveguides includes a diffusion channel with a plurality of inlets at a first end and an outlet at a second end opposite to the first end and separated from the inlets by a channel length. Each of the plurality of inlets includes a central inlet flowing a first resin into the diffusion channel such that the first resin flows along the channel length of the diffusion channel toward the outlet, and an outer inlet flowing a second resin along a periphery of the first resin. The second resin may have an index of refraction different than the first resin. The diffusion may (Continued)

occur between portions of the first resin and portions of the second resin over the channel length to form a composite resin having a profile with a plurality of indices of refraction in at least one dimension.

7 Claims, 7 Drawing Sheets

(51) Int. Cl.
  *G02B 6/138* (2006.01)
  *B29D 11/00* (2006.01)
  *F21V 8/00* (2006.01)
  *G02B 6/12* (2006.01)
  *G02B 6/122* (2006.01)

(52) U.S. Cl.
  CPC .......... *G02B 6/0065* (2013.01); *G02B 6/122* (2013.01); *G02B 6/12028* (2013.01); *G02B 6/138* (2013.01); *G02B 2006/1218* (2013.01); *G02B 2006/12095* (2013.01); *G02B 2006/12102* (2013.01)

(58) Field of Classification Search
  CPC ............ G02B 2006/1218; G02B 6/138; G02B 6/0065; B29D 11/00663; B29D 11/00682
  See application file for complete search history.

(56) References Cited

U.S. PATENT DOCUMENTS

| | | | | |
|---|---|---|---|---|
| 5,436,759 A * | 7/1995 | Dijaili | H01S 5/50 | 359/333 |
| 5,448,404 A * | 9/1995 | Schrenk | F21V 3/04 | 359/584 |
| 5,555,525 A * | 9/1996 | Ho | B29D 11/00682 | 385/143 |
| 5,593,621 A * | 1/1997 | Koike | B29D 11/00663 | 264/1.29 |
| 5,599,897 A * | 2/1997 | Nishiguchi | C08G 64/10 | 385/100 |
| 5,614,253 A * | 3/1997 | Nonaka | B29D 11/00721 | 427/163.2 |
| 5,639,512 A * | 6/1997 | Nonaka | B29D 11/00721 | 427/163.2 |
| 5,729,645 A * | 3/1998 | Garito | B29D 11/00 | 385/123 |
| 5,760,139 A * | 6/1998 | Koike | B29C 39/006 | 525/199 |
| 5,783,636 A * | 7/1998 | Koike | B29C 39/006 | 525/199 |
| 6,075,913 A * | 6/2000 | Cohen | G02B 6/4214 | 385/47 |
| 6,106,745 A * | 8/2000 | Krins | G02B 6/02038 | 264/1.27 |
| 6,115,187 A * | 9/2000 | Tabata | G02B 3/005 | 359/654 |
| 6,185,353 B1 * | 2/2001 | Yamashita | B29D 11/00682 | 264/1.29 |
| 6,254,808 B1 * | 7/2001 | Blyler, Jr. | B29D 11/00682 | 264/1.29 |
| 6,307,992 B2 * | 10/2001 | Yamashita | B29D 11/00682 | 264/1.29 |
| 6,573,963 B2 * | 6/2003 | Ouderkirk | G02B 5/3016 | 349/115 |
| 6,576,166 B1 * | 6/2003 | Perrin | B01F 5/0683 | 264/1.29 |
| 6,613,170 B1 * | 9/2003 | Ohno | B29C 66/452 | 156/272.2 |
| 6,631,233 B2 * | 10/2003 | Yamashita | B29D 11/00682 | 264/1.29 |
| 6,697,552 B2 * | 2/2004 | McGreer | G02B 6/12011 | 385/37 |
| 6,859,600 B2 * | 2/2005 | Khudyakov | C03C 25/1065 | 385/114 |
| 6,861,148 B2 * | 3/2005 | White | B29D 11/00721 | 385/123 |
| 6,901,198 B2 * | 5/2005 | Shimizu | B29C 39/02 | 385/129 |
| 6,977,018 B2 * | 12/2005 | Ohno | B29C 66/452 | 156/272.2 |
| 6,982,016 B2 * | 1/2006 | Ohno | B29C 66/452 | 156/275.5 |
| 7,135,133 B2 * | 11/2006 | Walker | B29D 11/00682 | 264/1.24 |
| 7,166,322 B2 * | 1/2007 | Inui | B29D 11/00663 | 427/163.2 |
| 7,266,277 B2 * | 9/2007 | Hamada | G02B 6/138 | 385/129 |
| 7,399,498 B2 * | 7/2008 | Inui | C08J 3/28 | 427/162 |
| 7,777,964 B2 * | 8/2010 | Abe | G02B 3/0037 | 359/654 |
| 9,063,082 B2 * | 6/2015 | Bjellqvist | C08F 2/46 | |
| 9,348,143 B2 * | 5/2016 | Gao | G02B 27/0172 | |
| 9,448,337 B2 * | 9/2016 | Kitamura | H01L 27/14627 | |
| 9,488,848 B2 * | 11/2016 | Ouderkirk | G02B 27/283 | |
| 9,513,480 B2 * | 12/2016 | Saarikko | G02B 5/1861 | |
| 9,720,237 B1 * | 8/2017 | Fu | G02B 27/0172 | |
| 9,733,475 B1 * | 8/2017 | Brown | G02B 27/0101 | |
| 9,740,006 B2 * | 8/2017 | Gao | G02B 27/0172 | |
| 9,753,286 B2 * | 9/2017 | Gao | G02B 27/0172 | |
| 9,841,600 B2 * | 12/2017 | Ouderkirk | G02B 27/0172 | |
| 9,851,576 B2 * | 12/2017 | Ouderkirk | G02B 27/283 | |
| 9,864,207 B2 * | 1/2018 | Ouderkirk | G02B 27/283 | |
| 2001/0000140 A1 * | 4/2001 | Yamashita | G02B 6/02038 | 385/124 |
| 2002/0041042 A1 * | 4/2002 | Walker | B29D 11/00682 | 264/1.24 |
| 2002/0044754 A1 * | 4/2002 | Yamashita | B29D 11/00682 | 385/124 |
| 2002/0113937 A1 * | 8/2002 | Ouderkirk | G02B 5/3016 | 349/187 |
| 2003/0201065 A1 * | 10/2003 | Ohno | B29C 66/452 | 156/272.2 |
| 2004/0057689 A1 * | 3/2004 | Shimizu | B29C 39/02 | 385/129 |
| 2004/0129363 A1 * | 7/2004 | Ohno | B29C 66/452 | 156/64 |
| 2004/0131320 A1 * | 7/2004 | Inui | C08J 3/28 | 385/123 |
| 2004/0179798 A1 * | 9/2004 | Walker | B29D 11/00682 | 385/124 |
| 2004/0212108 A1 * | 10/2004 | Fournier | G02B 6/02033 | 264/1.27 |
| 2005/0058420 A1 * | 3/2005 | Inui | B29D 11/00663 | 385/129 |
| 2005/0259935 A1 * | 11/2005 | Hamada | G02B 6/138 | 385/129 |
| 2008/0061457 A1 * | 3/2008 | Walker | B29D 11/00663 | 264/1.24 |
| 2008/0116596 A1 * | 5/2008 | Kegasawa | B29D 11/00682 | 264/1.29 |
| 2009/0257128 A1 * | 10/2009 | Abe | G02B 3/0087 | 359/620 |
| 2011/0013423 A1 * | 1/2011 | Selbrede | G02B 6/0028 | 362/613 |
| 2011/0235365 A1 * | 9/2011 | McCollum | G02B 6/0031 | 362/613 |
| 2012/0162549 A1 * | 6/2012 | Gao | G02B 27/0172 | 349/11 |
| 2012/0228121 A1 * | 9/2012 | Bjellqvist | C08F 2/46 | 204/157.64 |
| 2013/0242392 A1 * | 9/2013 | Amirparviz | G02B 27/0172 | 359/485.05 |
| 2013/0286146 A1 * | 10/2013 | Kitamura | G02B 3/0037 | 347/224 |
| 2014/0071539 A1 * | 3/2014 | Gao | G02B 27/0172 | 359/630 |

(56) References Cited

U.S. PATENT DOCUMENTS

| | | | | |
|---|---|---|---|---|
| 2015/0177531 | A1* | 6/2015 | Ouderkirk | G02B 5/3041 |
| | | | | 353/20 |
| 2015/0219896 | A1* | 8/2015 | Ouderkirk | G02B 5/30 |
| | | | | 359/630 |
| 2015/0219919 | A1* | 8/2015 | Ouderkirk | G02B 27/283 |
| | | | | 359/489.09 |
| 2016/0154245 | A1* | 6/2016 | Gao | G02B 27/0172 |
| | | | | 359/630 |
| 2016/0231568 | A1* | 8/2016 | Saarikko | G02B 5/1861 |
| 2017/0003514 | A1* | 1/2017 | Ouderkirk | G02B 27/283 |
| 2017/0212348 | A1* | 7/2017 | Fu | G02B 27/0172 |
| 2017/0235219 | A1* | 8/2017 | Kostamo | G03F 7/0002 |
| | | | | 264/40.1 |
| 2017/0336639 | A1* | 11/2017 | Gao | G02B 27/0172 |
| 2018/0059423 | A1* | 3/2018 | Ouderkirk | G02B 27/0172 |
| 2018/0074339 | A1* | 3/2018 | Ouderkirk | B32B 37/1284 |
| 2018/0088348 | A1* | 3/2018 | Ouderkirk | B32B 37/1284 |

FOREIGN PATENT DOCUMENTS

| | | | |
|---|---|---|---|
| CN | 1275479 A | | 12/2000 |
| CN | 102166877 A | * | 8/2011 |
| CN | 102166877 B | * | 7/2013 |

OTHER PUBLICATIONS

Yang et al., A Liquid Waveguide with Dispersion and Interference Effect, Thirteenth International Conference on Miniaturized Systems for Chemistry and Life Sciences (Year: 2009).*

Evans, J., "Simple Forms for Equations of Rays in Gradient-Index Lenses", American Journal of Physics, Aug. 1990, pp. 773-778, vol. 58, No. 8.

Jones, K.M. et al., "A Calculus of Variations Demonstration: The Gradient Index Lens", American Journal of Physics, Dec. 1988, p. 1099, vol. 56, No. 12.

Beadie, G., et. al., "Optical Properties of a Bio-Inspired Gradient Refractive Index Polymer Lens", Optics Express, Jul. 21, 2008, pp. 11540-11547, vol. 16, No. 15.

Bouchard, S. et al., "Grin Planar Waveguide Concentrator Used with a Single Axis Tracker", Optics Express, Mar. 10, 2014, 11 pages, vol. 22, No. S2.

Ponting, M. et al., "Polymer Nanostructures by Forced Assembly: Process, Structure, and Properties," Macromol. Symp., 2010, pp. 19-32, vol. 294, No. 1.

Ji, S. et al., "A Bio-Inspired Polymeric Gradient Refractive Index (GRIN) Human Eye Lens," Optics Express, Nov. 19, 2012, pp. 26746-26754, vol. 20, No. 24.

Bouchard, S. et al., "Planar Waveguide Concentrator Used with a Seasonal Tracker", Applied Optics, Oct. 1, 2012, pp. 6848-6845, vol. 51, No. 28.

Gleißner, U. et. al., "Optically and Rheologically Tailored Polymers for Applications in Integrated Optics", Sensors and Actuators A, 2016, pp. 224-230, vol. 241.

Kerns, J. et al., "Comparison of Irreversible Deformation and Yielding in Microlayers of Polycarbonate with Poly(methylmethacrylate) and Poly(styrene-co-acrylonitrile)," Journal of Applied Polymer Science, Aug. 15, 2000, pp. 1545-1557, vol. 77, No. 7.

Mueller, C. et al., "Breathable Polymer Films Produced by the Microlayer Coextrusion Process," Journal of Applied Polymer Science, 2000, pp. 816-828, vol. 78.

Makino, K. et al., "Low Loss and High Bandwidth Polystyrene-Based Graded Index Optical Fiber", Journal of Lightwave Technology, Jul. 15, 2013, pp. 2407-2412, vol. 31, No. 14.

Koike, Y. et al., "High Bandwidth Graded-Index Polymer Optical Fiber", Journal of Lightwave Technology, Jul. 1995, pp. 1475-1489, vol. 11, No. 7.

Chinese National Intellectual Property Administration, Office Action, Chinese Application No. 201811026221.0, dated Jan. 8, 2020, 19 pages.

* cited by examiner

MANUFACTURING A GRADED INDEX PROFILE FOR WAVEGUIDE DISPLAY APPLICATIONS

BACKGROUND

The present disclosure generally relates to waveguide displays, and specifically to a method of manufacturing a planar waveguide with a graded index profile in waveguide displays.

Graded index lenses (GRIN) create optical power within an optical material. Such GRIN lenses are widely used for collimating and imaging light in optical devices. Most GRIN lenses are in the form of a round lens or fiber with a gradient in refractive index present along two dimensions. Conventional GRIN lenses are manufactured by processes such as ion exchange, chemical vapor deposition, ion stuffing, partial polymerization, non-uniform distribution of high index molecules in a polymer matrix, neutron irradiation, and polymer layer coextrusion of polymers with a relatively high and low index of refraction, etc. In such processes, the GRIN lenses include layers that are significantly thinner than the wavelength of light, and the effective refractive index of the GRIN lenses is controlled by the ratio of the total amount of high and low index polymers.

Unfortunately, current methods for making GRIN lenses have several problems. For example, waveguides made by layer coextrusion produces optics with much less scatter for light propagating at near-normal angles to the surface of the waveguide, but can have very high scatter for light propagating parallel to the surface of the waveguide. Accordingly, conventional processes are not suitable for making GRIN waveguides with better durability and compactness.

SUMMARY

A system for fabricating optical waveguides includes a diffusion channel with a plurality of inlets at a first end and an outlet at a second end opposite to the first end and separated from the plurality of inlets by a channel length. The plurality of inlets includes a central inlet that flows a first resin into the diffusion channel such that the first resin flows along the channel length of the diffusion channel toward the outlet, and at least one outer inlet that flows a second resin along a periphery of the first resin. The second resin may have an index of refraction different than the first resin. The diffusion may occur between portions of the first resin and portions of the second resin over the channel length to form a composite resin having a profile with a plurality of indices of refractions in at least one dimension. In one example, the plurality of indices of refraction in the profile is achieved by at least one of: a flow rate of the first resin and the second resin, a time allowed for the occurrence of diffusion, a proportion of the first resin with respect to the second resin, a gradient of temperature across the diffusion channel, and some combination thereof. In some configurations, the composite resin has a substantially parabolic profile with a plurality of index of refractions along a first dimension and a fixed value of index of refraction along a second dimension and a third dimension that are orthogonal to the first dimension. The composite resin may form, e.g., a waveguide having a graded index of refraction. The graded index of refraction includes a plurality of indices of refraction in at least one dimension. In some embodiments, the plurality of indices of refraction may have a substantially parabolic distribution.

In some embodiments, the system includes a diffusion system that combine portions of the first resin and the second resin. The diffusion system may apply the combined first resin and the second resin onto a substrate. The system may also include a rotating assembly that adjusts a portion of the substrate along a second dimension orthogonal to the first dimension. The system may also include an irradiation system that cures at least a portion of the combined first resin and second resin.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A manufacturing system is described for manufacturing optical waveguides with graded index profile having a substantially parabolic profile with a plurality of index of refractions along a first dimension and a fixed value of index of refraction along a second dimension and a third dimension, where the second dimension and the third dimension are orthogonal to the first dimension. In some configurations, the plurality of index of refractions in the profile is achieved by at least one of: a flow rate of a first resin and a second resin, a time allowed for the occurrence of diffusion of the first resin with the second resin, a proportion of the first resin with respect to the second resin, a gradient of temperature across the diffusion channel, and some combination thereof.

In some embodiments, the index of refraction varies according to the formula $n=n_0(1-AZ^2/2)$, where A is a positive coefficient, Z is the displacement from a mid-plane between the front and back surface of the optical waveguide, n is the refractive index along the direction of the displacement, and no is the index of refraction at the mid-plane. The graded index profile may be parabolic or hyperbolic. The graded index profile may be symmetric from the mid-plane to the front and back surfaces of the waveguide, or may have different profiles. For example, the refractive index coefficient A may be different for positive and negative values of 'Z'. The mid-plane is generally located at a mid-point between the front and back surfaces of the optical waveguide, but may also be proximate to either the front and/or back surfaces of the optical waveguide. The first resin and the second resin are associated with a polydispersity index determined by the ratio of the average molecular weight by weight ($M_w$) to the average molecular weight by number ($M_n$) of each resin. In some configurations, the average molecular weight by weight and the average molecular weight by number are determined by size exclusion chromatography. In a different configuration, an image created by the optical waveguide has a modulation transfer function (MTF) of at least 100 line pairs per millimeter (mm) corresponding to a 50% contrast ratio of the image. In some examples, the MTF of the optical waveguide ranges from 5 to 50 lines pairs per mm corresponding to the 50% contrast ratio of the image.

Figure 1:
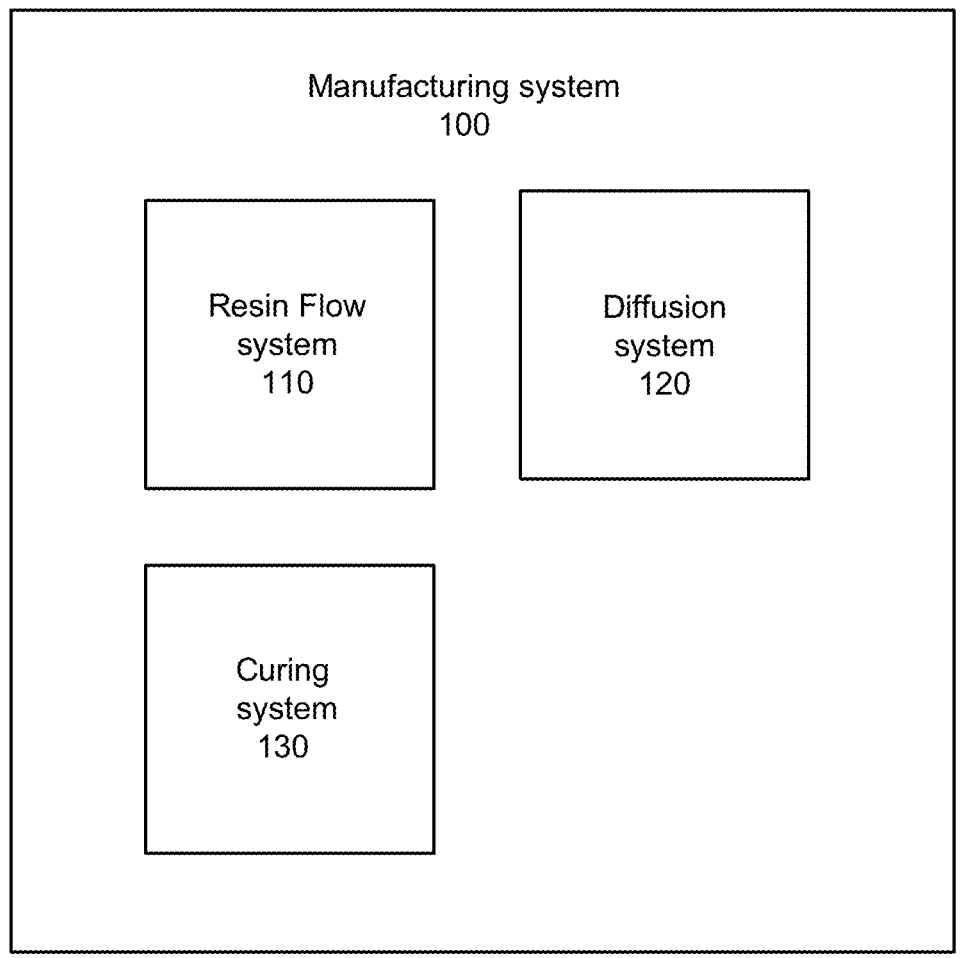
FIG. 1 is a block diagram of a manufacturing system, in accordance with one embodiment.

FIG. 1 is a block diagram of a manufacturing system 100, in accordance with one embodiment. The manufacturing system 100 is a group of devices that produce an optical waveguide with a graded index of refraction. The manufacturing system 100 includes a resin flow system 110, a diffusion system 120, a curing system 130, or some combination thereof. In some embodiments, the manufacturing system 100 includes a controller (not shown here) that controls each system in the manufacturing system 100.

The resin flow system 110 is a system that performs a flow of a substance on a substrate creating a change in thickness of the substrate. The resin flow system 110 includes a central inlet, one or more outer inlets, a diffusion channel, and an outlet, as described below in conjunction with FIG. 3. In one example, the resin flow system 110 flows a first resin into the central inlet at a first end of the diffusion channel with the outlet at a second end separated from the inlets by a channel length. The resin flow system 110 flows a second resin into the outer inlet along a periphery of the first resin.

In some configurations, the resins entering the resin flow system 110 may include a set of resins with a high refractive index (e.g. above 1.5) and a low refractive index (e.g. below 1.5). The desired refractive index profile of the optical waveguide may be achieved by controlling flow rates, mixing of resins provided to the resin flow system 110, time allowed for diffusion before curing, and a gradient of temperature across the resin flow system 110. The flow rate and volume of the resin flow system 110 determines the residence time of the first resin. In some examples, the average residence time of the first resin is in the range of 1 to 1000 seconds. In alternate examples, the average residence time of the first resin is in the range of 1 and 20 seconds. In some examples, the average temperature of the first resin is in the range of 0 to 250° C. In alternate examples, the average temperature of the first resin is in the range of 20 to 100° C. In some configurations, the first resin may be heated to a uniform temperature. In alternate configurations, the first resin may have a temperature gradient. For example, one or more resins may be heated to a plurality of temperatures before combining the one or more resins in the resin flow system 110. The temperature of the one or more resins may differ by 10, 20, 50, or more than 100° C. In some applications, it may be desired to have the majority of the diffusion occurring after the deposition of layers of resin on a substrate, and before the resin is cured.

The diffusion system 120 is a system that performs a diffusion of an additional material into a resin. In some configurations, the additional material is one or more resins with molecules that are responsible for the characteristic chemical reactions of the resins. In one example, the diffusion system 120 performs a diffusion of portions of a first resin and a second resin over a channel length to form a composite resin having a profile with a plurality of index of refractions in at least one dimension. For example, the channel length may range from about 1 to 100 cm, the channel width may range from about 1 to 100 cm, and the channel height may range from about 0.1 to 10 cm.

The curing system 130 is a system that performs a curing of a substrate to vary the index of refraction of the substrate. The curing system 130 cures the substrate to stop the diffusion of one or more additional layers formed on the substrate. In some embodiments, the curing system 130 includes a convection oven, a hotplate, a rapid thermal processing system, a UV irradiation system, or some combination thereof. The diffusion furnace is a furnace that drives the resins on the patterned substrate at a range of temperatures and/or pressures in environments such as vacuum, nitrogen, dry air, etc. In some embodiments, the curing system 130 performs a heating process including, but not restricted to, an adiabatic process, a thermal flux process, and an isothermal process. The rapid thermal processing system is a single wafer hot processing system that minimizes the thermal budget of a process by reducing the time at a given temperature in addition to, or instead of, reducing the temperature. The UV irradiation system is an illumination system that illuminates ultra-violet radiation on the resins to initiate curing.

In some configurations, the curing system 130 performs the curing on one or more initiators in the resins through actinic radiation (e.g. blue light, UV, or electron beams), thermal curing, or some combination thereof. The resins may be cured through a combination of, for example, thermally activated initiators in part or all of the resins, and photoinitiated curing in part or all of the resins. In some configurations, the curing system 130 may partially cure the optical waveguide while traveling through the resin flow system 110, and curing may be completed after the partially cured waveguide exits the resin flow system 110. Such an approach allows the curing system 130 to determine the shape of the optical waveguide without the risk of the partially cured resin sticking to the walls of the resin flow system 110.

In some embodiments, the manufacturing system 100 includes a plurality of resin flow systems 110 and a controller (not shown here) that controls each of the resin flow systems 110. For example, the manufacturing system 100 includes a first resin flow system 110 that flows a first resin at a first flow rate, and a second resin flow system 110 that flows the first resin at a second flow rate based on a processing instruction from the controller.

Figure 2A:
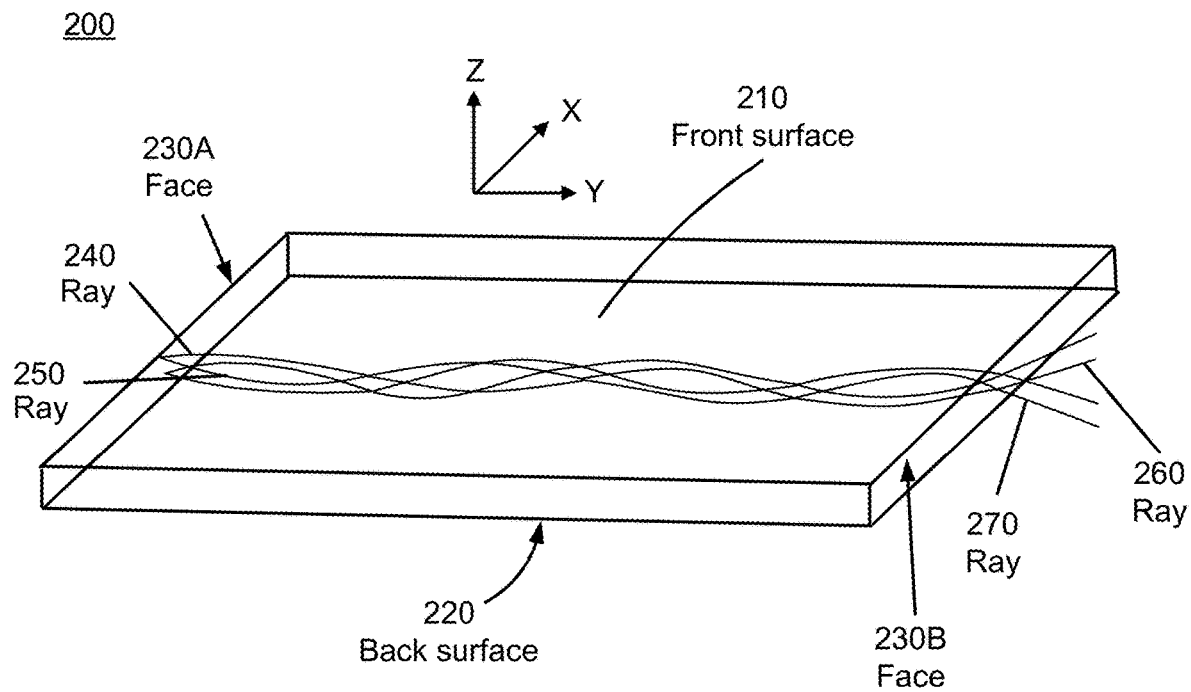
FIG. 2A illustrates an isometric view of a waveguide with graded index profile, in accordance with an embodiment.

FIG. 2A illustrates an isometric view of a waveguide 200 with graded index profile fabricated using the manufacturing system 100 of FIG. 1, in accordance with an embodiment. The waveguide 200 is an optical device that receives a beam of light at a first end and transmits the received beam of light to a second end different from the first end. For example, the optical device is an optical waveguide, lens, mirror, etc. The waveguide 200 includes a front surface 210, a back surface 220, a face 230A, and a face 230B. In the embodiment of FIG. 2A, the waveguide 200 receives the ray 240 and the ray 250 at the face 230A and transmits the ray 260 and the ray 270 from the face 230B.

As shown in FIG. 2A, the waveguide 200 has a substantially parabolic index profile along the Z-dimension, and a fixed value of index of refraction along the X-dimension and Y-dimension. In some configurations, there may be some variation of index of refraction along the X-dimension and Y-dimension. For example, the index of refraction of the waveguide 200 may be modulated or formed into a desired profile, depending on the application. In general, the index of refraction of the waveguide 200 in both the X-dimension and the Y-dimension may be constant for planes parallel to the front surface 210, and the back surface 220. In one example, the ratio of the length of the waveguide 200 along the Y-axis to the thickness along the Z-axis, and the length of the waveguide 200 along the X-axis to the thickness along the Z-axis are both at least 10. The waveguide 200 is made of polymers including, but not restricted to, polyacrylate, polyurethane, polysilicone, polyester, polyolefin, polyamide, polycarbonate, any other optically transparent polymers and/or copolymers, and some combination thereof. In one example, the waveguide 200 is made of a first resin and a second resin associated with a polydispersity index of at most 10.

In some embodiments, the waveguide 200 is a transparent, planar waveguide having a graded index profile along the Z-dimension with a variation of less than 0.1 per micron, and a constant index of refraction along the X-dimension and the Y-dimension. The waveguide 200 includes a central layer (not shown) located at a midpoint between the front surface 210 and the back surface 220, where the index of refraction of the central layer is at least 0.01 higher than the index of refraction of areas adjacent to the front surface 210 and the back surface 220. In some configurations, an image created by the waveguide 200 has a modulation transfer function of at least 100 line pairs per mm corresponding to a 50% contrast ratio of the image.

Figure 2B:
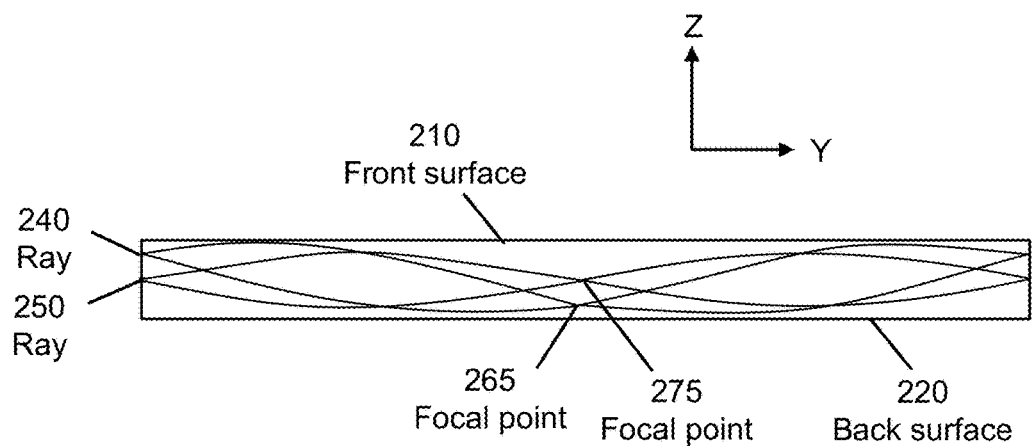
FIG. 2B illustrates a cross-sectional view of the waveguide of FIG. 2A with graded index profile, in accordance with an embodiment.

FIG. 2B illustrates a cross-sectional view of the waveguide 200 with graded index profile fabricated using the manufacturing system 100 of FIG. 1, in accordance with an embodiment. In the embodiment of FIG. 2B, the waveguide 200 has a graded index of refraction in the Z-dimension. The ray 240 and the ray 250 propagate through the waveguide 200, and are focused at the focal point 265 and the focal point 275 as the rays 240 and 250 propagate through the waveguide 200. The focal points 265 and 275 form images of the rays 240 and 250, and allow a one-dimensional image of sources to be relayed along the waveguide 200.

Figure 3:
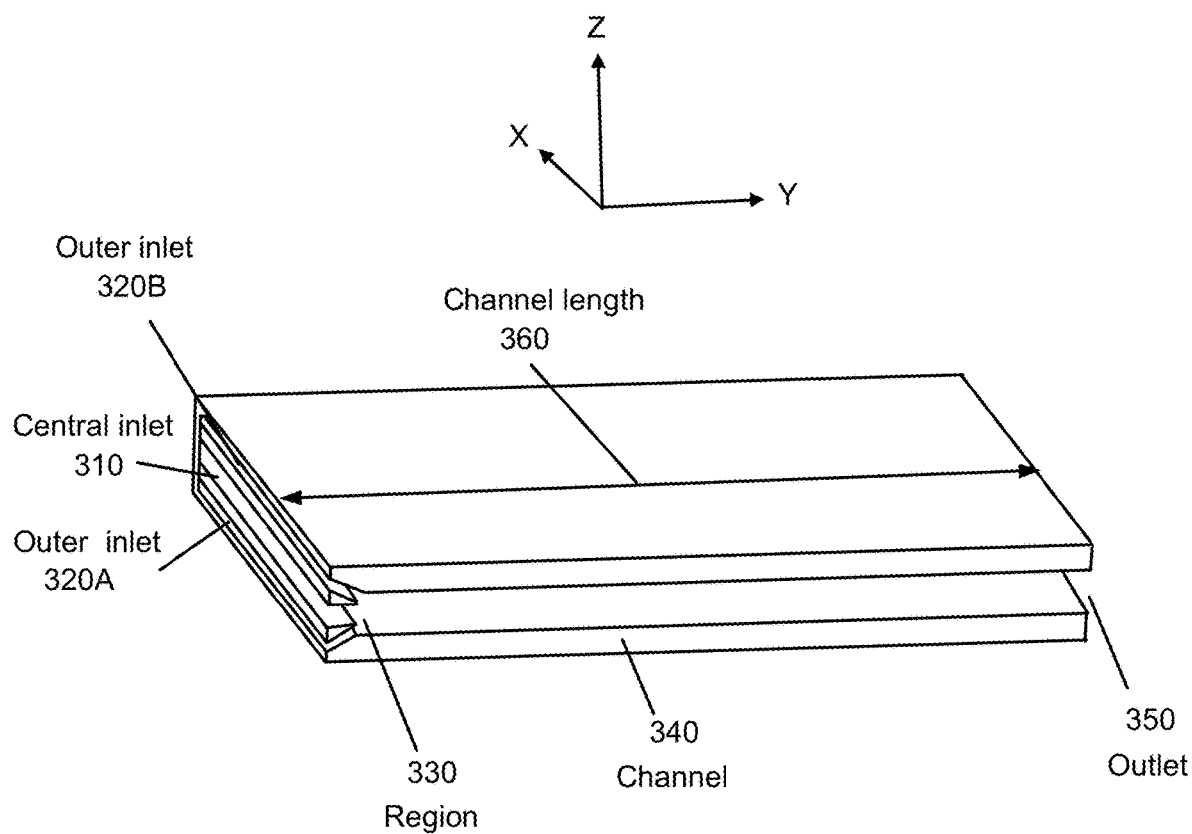
FIG. 3 illustrates an isometric view of a system for manufacturing the waveguide of FIG. 2A, in accordance with an embodiment.

FIG. 3 illustrates an isometric view of a system 300 for manufacturing the waveguide 200 of FIG. 2A, in accordance with an embodiment. The system 300 includes a central inlet 310, an outer inlet 320A, an outer inlet 320B, a channel 340, and an outlet 350. In one example, the central inlet 310 flows a first resin (e.g. methylmethacrylate), and the outer inlet 320A and 320B flow a second resin (e.g. hexafluorisopropylacrylate). The first and the second resins are brought in contact with each other in region 330, and may partially diffuse into each other along the channel 340. The combination of the first resin and the second resin exit the system 300 at the outlet 350.

In alternate embodiments, the system 300 includes the central inlet 310, and the outer inlet 320A. The central inlet 310 inputs the first resin into the channel 340 such that the first resin flows along the channel length 360 of the channel 340 toward the outlet 350. The outer inlet inputs a second resin along a periphery of the first resin, where diffusion occurs between portions of the first resin and portions of the second resin over the channel length to form a composite resin having a profile with a plurality of index of refractions in at least one dimension.

Figure 4A:
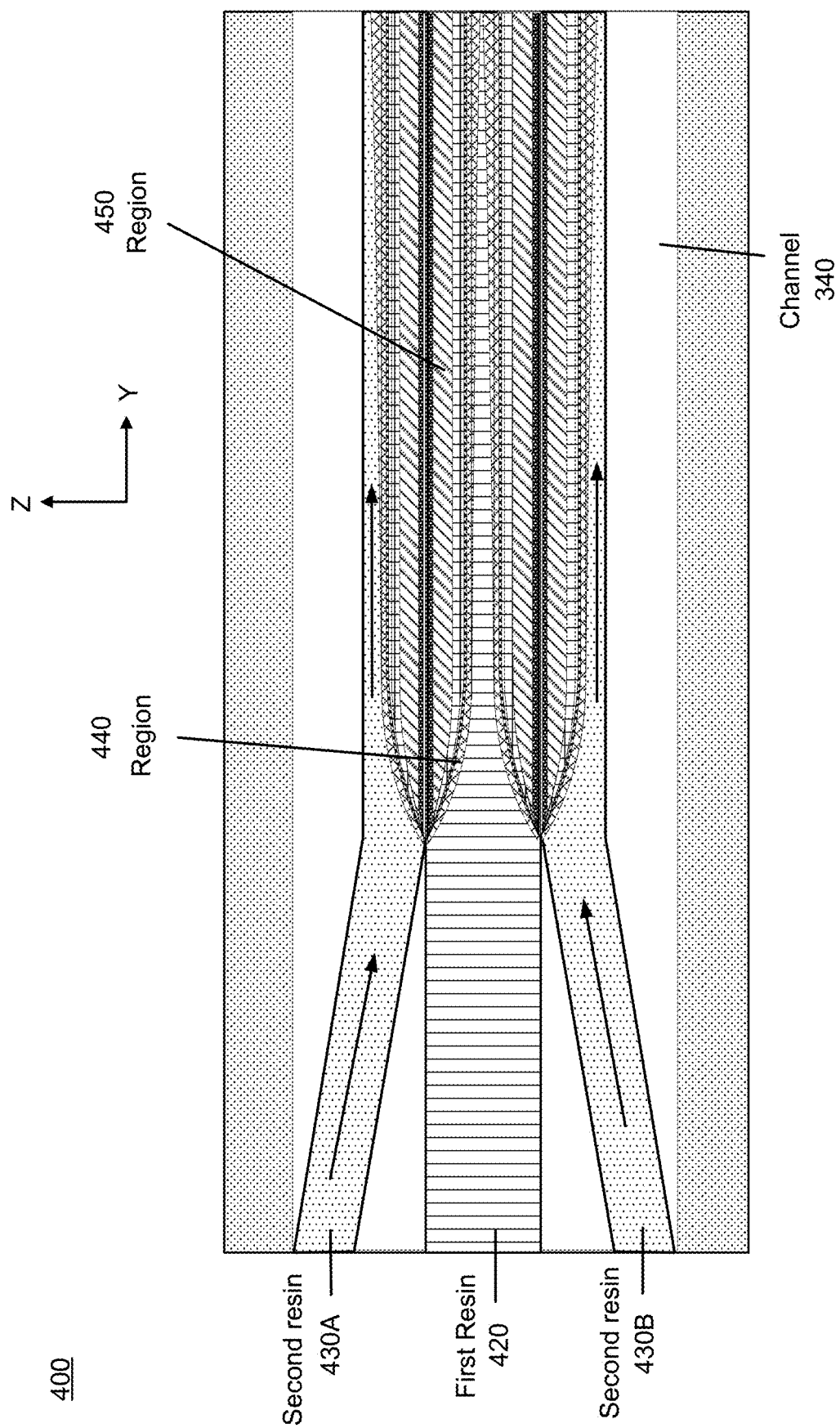
FIG. 4A illustrates a cross-sectional view of a portion of the system of FIG. 3 showing the diffusion of one or more resins, in accordance with an embodiment.

FIG. 4A illustrates a cross-sectional view of a portion 400 of the system 300 of FIG. 3 showing the diffusion of one or more resins, in accordance with an embodiment. The portion 400 shows the occurrence of diffusion in the system 300, where the first resin 420 mixes with the second resin 430A and 430B, come in contact in the region 440, and show significant diffusion in the region 450. The first resin 420 and the second resin 430A and 430B diffuse into each other in the channel 340 and after being deposited on a substrate, up to the point where each of the resins is cured. The combination of diffusion occurring in the channel 340 and on the substrate creates the desired refractive index profile. If a major portion of a desired diffusion occurs in the channel 340, preferably, the channel 340 is no wider than about 100 cm, more preferably less than 10 cm, and most preferably less than about 1 cm. The average flow rates may be less than 100 cm/min, more preferably less than 20 cm/min, and most preferably less than 10 cm/min.

Figure 4B:
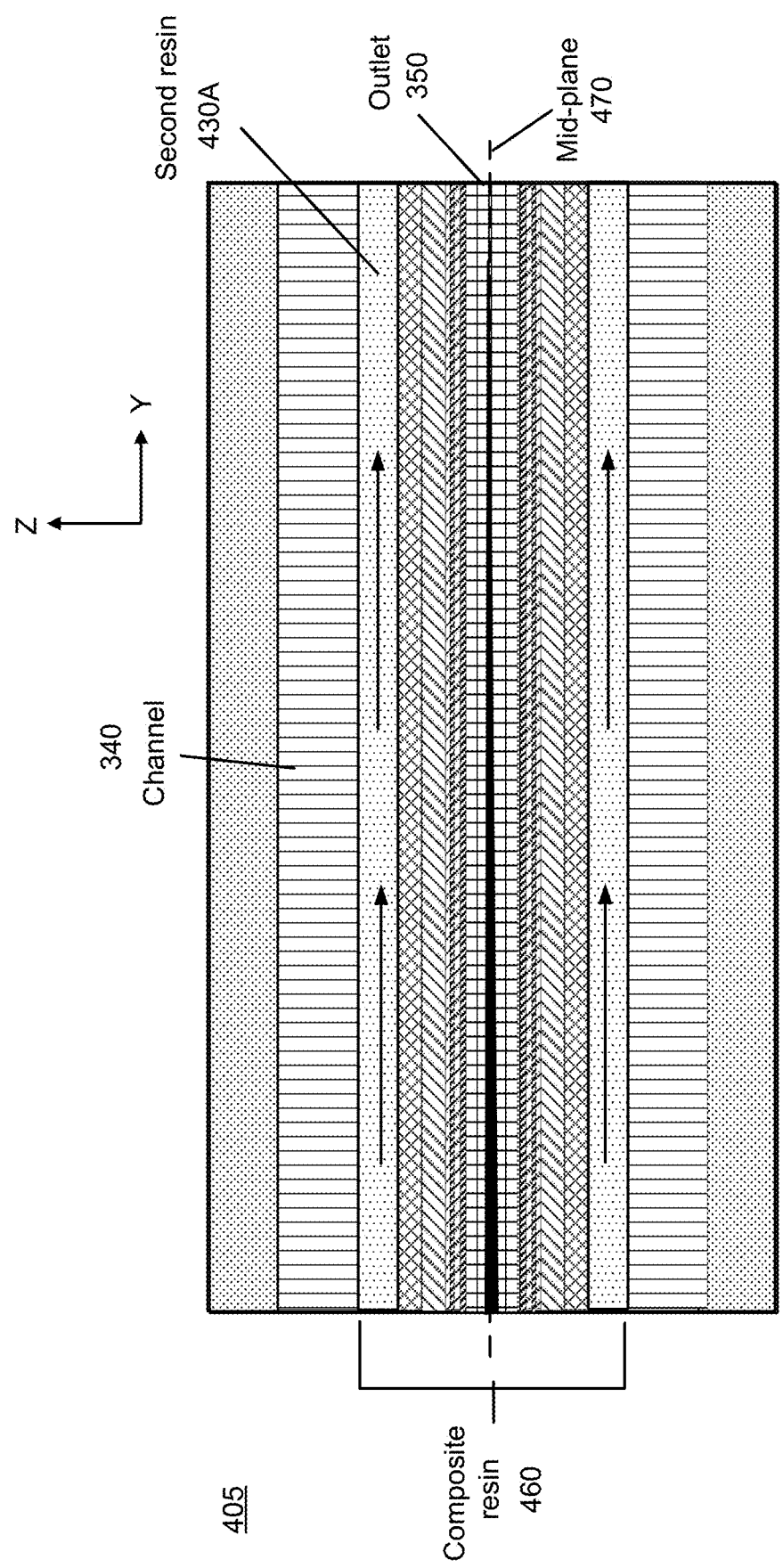
FIG. 4B illustrates a cross-sectional view showing a composite resin formed near an outlet of the system of FIG. 3, in accordance with an embodiment.

FIG. 4B illustrates a cross-sectional view of a portion 405 of the system 300 of FIG. 3 with a composite resin 460 formed near the outlet 350, in accordance with an embodiment. The portion 405 shows the occurrence of diffusion in the system 300, where the channel 340 directs a composite resin 460 formed from portions of the first resin 420, the second resin 430A, and the second resin 430B to the outlet 350. In some embodiments, the composite resin 460 may have gradient in the index profile that is substantially curved (e.g., parabolic) from a mid-plane 470 located at a mid-point between the front surface 210 and the back surface 220 of the waveguide 200 of FIG. 2A. In alternate embodiments, the composite resin 460 has a rotationally symmetrical profile with reference to the Y-dimension. The refractive index of the composite resin 460 will preferably have a refractive index of at least 1.55 in the center, and at most 1.50 at the sides.

Figure 5:
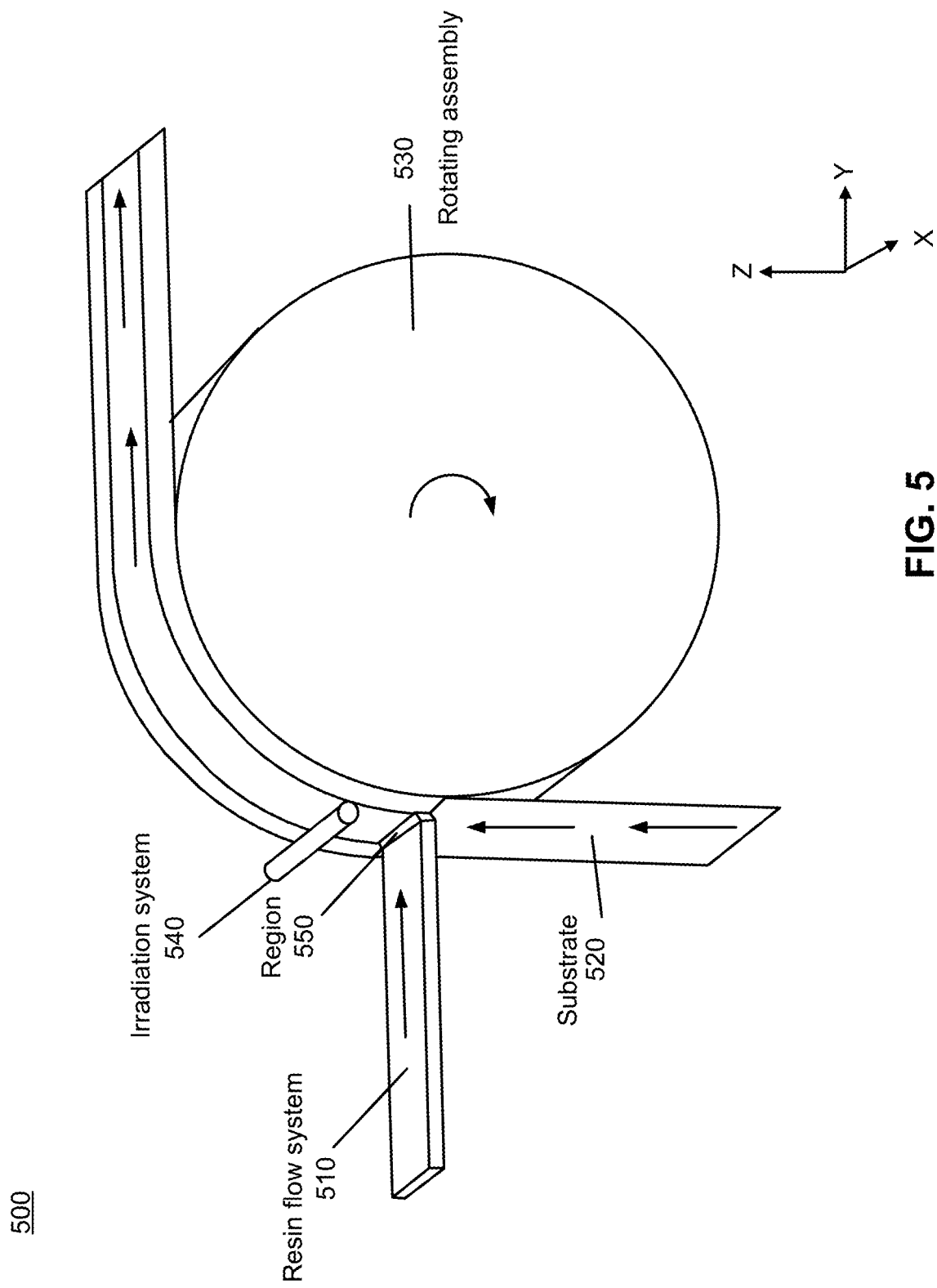
FIG. 5 illustrates an isometric view of a system for manufacturing the waveguide of FIG. 2A, in accordance with an embodiment.

FIG. 5 illustrates an isometric view of a system 500 for manufacturing the waveguide 200 of FIG. 2A, in accordance with an embodiment. The system 500 includes a resin flow system 510, a substrate 520, a rotating assembly 530, and an irradiation system 540. The resin flow system 510 is an embodiment of the resin flow system 110 of FIG. 1. The substrate 520 is a body that mounts the waveguide 200 of FIG. 2A. For example, the substrate 520 can be a thin layer of plastic sheet. Suitable substrates include, but are not limited to, polyethylene terephthalate, polyethylene, and polyimide. Substrate thickness is preferably between 10 and 100 microns. The rotating assembly 530 performs a rotation of the substrate 520 about a first dimension (e.g., rotate around the X-dimension) such that the substrate 520 moves along a second dimension and a third dimension (e.g. Y-dimension and Z-dimension). The irradiation system 540 is an illumination system that performs a curing of at least a portion of a mixture of one or more resins. Movement of the substrate 520 may be accomplished by other means as well, including sliding the substrate 520 over the outlet of the resin flow system 510, or using a translation stage. Alternately, the resin may be allowed to flow out of the resin flow system 510 forming a freely suspended resin stream, the resins may then be cured to form a waveguide.

In the embodiment of FIG. 5, the resin flow system 510 applies one or more resins to the substrate 520 supported by the rotating assembly 530, and the resins flow from the resin flow system 510 to the substrate 520 forming a region 550, where there is little mixing in the transition. In some configurations, UV light may be applied to a UV photoinitiated resin flow system 510 using one or more UV emitting lamps inside the irradiation system 540.

In some configurations, the irradiation system 540 cures the resins through an actinic radiation (e.g. blue light, UV, or electron beams), thermal curing, or a combination of both. The two or more resins may use different initiation or curing approaches. For example, one way of forming the substrate 520 is to use a thermal initiator in the resins near the center of the resin flow system 510, and a photoinitiator near or against the walls of the resin flow system 510. The substrate 520 may be partially cured while traveling through the resin flow system 510, and curing may be completed after the partially cured substrate 520 exits the outlet of the resin flow system 510. This approach allows the curing system 130 of FIG. 1 to determine the shape of the substrate 520 without the risk of the partially cured resin sticking to the walls of the resin flow system 510.

In some embodiments, the resins entering the resin flow system 510 may be a set of resins with a range of refractive indices. For example, if there are five inlets in the resin flow system 510, with one of them being the center inlet (e.g. inlet 3), two inlets (e.g. inlet 1 and 5) flowing the resins that form the outermost surfaces of the waveguide 200, and the remaining two inlets (e.g. inlet 2 and 4) may be provided with a mixture of resins with a high and low index of refraction. High index resins may have a refractive index of at least 1.55. Low index resins may have a refractive index of at most 1.5. The desired refractive index profile of the waveguide 200 may be achieved by controlling process parameters, including, but not restricted to, flow rates, mixing of resins provided to the resin flow system 510, time allowed for diffusion before curing, and a gradient of temperature across the resin flow system 510.

In an alternate embodiment, the substrate 520 supports at least a first and a second polymer coextruded to form a stack of at least three alternating layers of polymer sheets heated at or above the glass transition temperature of the first and second polymer. The stack of polymers may be allowed to diffuse into each other, and the substrate 520 may be heated until the stack reaches the desired refractive index profile. The first and second polymer may have substantially similar solubility parameters. In some configurations, the Relative Energy Difference (RED) of the resins are at most 1, based on the Hansen solubility parameters.

In a different embodiment, a low molecular weight solvent or plasticizer may be added to the first and second resin to promote diffusion. For example, the stack of resins may be heated in the presence of an organic or inorganic material that is absorbed into the stack. The solvent or plasticizer may be removed from the stack after the diffusion is complete. In one example, the first and second polymer include polyacrylates (e.g. polymethylmethacrylate and poly(2,2,2-trifluoroethyl methacrylate)), polyesters (e.g. polyethylene terephthalate and poly(2,6-ethylene naphthalate), isophthalate copolymers), and some other miscible polymer resins from the families of polycarbonates, poly silicones, polyolefins, polystyrenes, polyfluorocarbons, and some combination thereof. In an alternate embodiment, different polymer sheets or films may be stacked on each other and annealed by the curing system 130 of FIG. 1. In some configurations, one or more of the polymer layers may contain a low molecular weight refractive index modifier that diffuses through the polymer resins, and create the desired refractive index profile.

Figure 6:
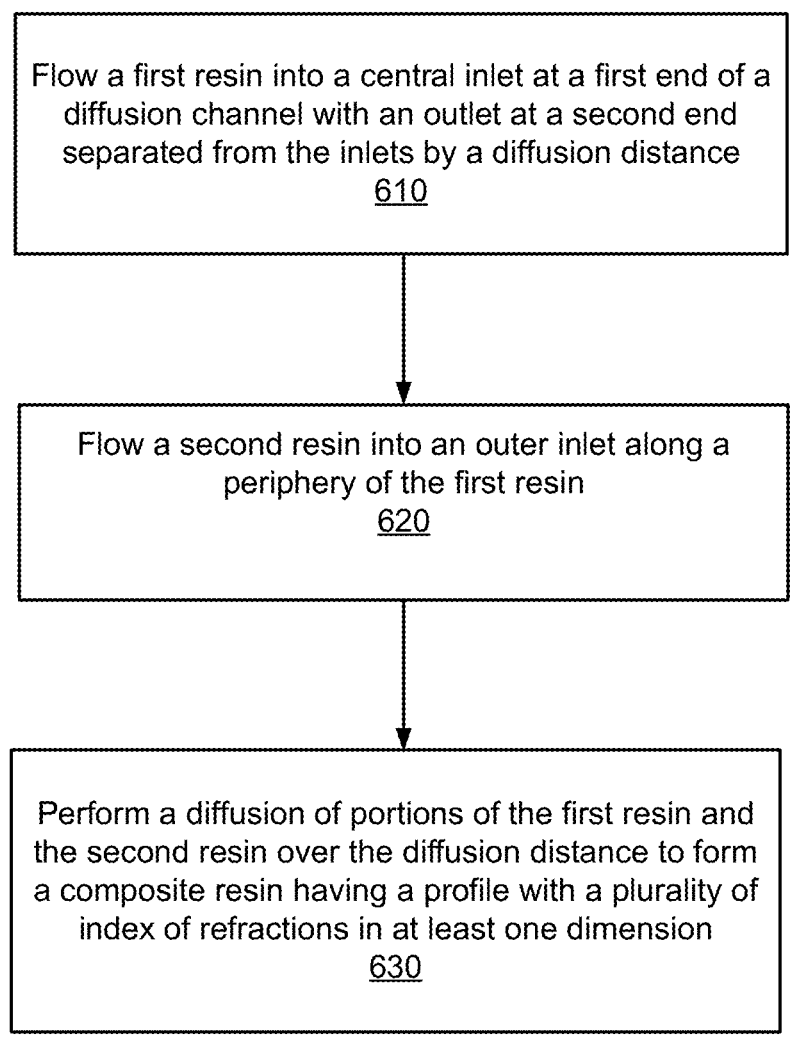
FIG. 6 is a flowchart illustrating a process performed by the manufacturing system of FIG. 1, in accordance with one embodiment.

FIG. 6 is a flowchart illustrating the process 600 performed by the manufacturing system 100 of FIG. 1, in accordance with one embodiment. The process 600 of FIG. 6 may be performed by the manufacturing system 100. Other entities may perform some or all of the steps of the process in other embodiments. Likewise, embodiments may include different and/or additional steps, or perform the steps in different orders.

As described above with reference to FIG. 1, the resin flow system 110 flows 610 a first resin into a central inlet at a first end of the diffusion channel with an outlet at a second end separated from the inlets by a channel length. The resin flow system 110 flows 620 a second resin into an outer inlet along a periphery of the first resin. The diffusion system 120 performs 630 a diffusion of portions of the first resin and the second resin over the channel length to form a composite resin having a profile with a plurality of index of refractions in at least one dimension. In some configurations, the manufacturing system 100 achieves the plurality of index of refractions in the profile by at least one of: a flow rate of the first resin and the second resin, a time allowed for the occurrence of diffusion, a proportion of the first resin with respect to the second resin, a gradient of temperature across the diffusion channel, and some combination thereof.

Additional Configurations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A waveguide comprising:
    a waveguide body comprising a solid composite resin, the waveguide body further comprising:
        a first surface,
        a second surface parallel to the first surface, and
        a central layer in between the first surface and the second surface, wherein the solid composite resin has a substantially graded refractive index profile with a refractive index varying along a first dimension orthogonal to the first and second surfaces, wherein the refractive index is substantially not varying along second and third dimensions parallel to the first and second surfaces, wherein the first, second, and third dimensions are orthogonal to each other,
    wherein:
        the solid composite resin includes a cured inter-diffused mixture of first and second resins, wherein the cured inter-diffused mixture was obtained by co-flowing the first and second resins in a diffusion channel and curing the co-flown inter-diffused mixture of the first and second resins at a distance from an inlet of the diffusion channel,
        a ratio of the second resin to the first resin in the solid composite resin varies from the central layer to the first surface and the second surface along the first dimension, and
        a first index of refraction of the first resin is different from a second index of refraction of the second resin.

2. The waveguide of claim 1, wherein an image of a light source captured through the waveguide body has a modulation transfer function of at least 5 line pairs per millimeter at a contrast ratio of 50%.

3. The waveguide of claim 2, wherein an image of a light source captured through the waveguide body has a modulation transfer function of at least 100 line pairs per millimeter.

4. The waveguide of claim 1, wherein the substantially graded refractive index profile is a substantially parabolic profile extending along the first dimension, the parabolic profile being symmetrical about a mid-point between the first surface and the second surface.

5. The waveguide of claim 1, wherein the solid complex resin is manufactured by a process comprising:
    flowing the first resin into a central flat inlet of a plurality of inlets at a first end of the diffusion channel-including an outlet at a second end opposite to the first end and separated from the plurality of inlets by a channel length; and
    flowing the second resin into an outer flat inlet of the plurality of inlets along a periphery of the first resin;
    wherein at least a portion of the second resin diffuses into at least a portion of the first resin in the diffusion channel over the channel length to form a mixture of the first resin and the second resin.

6. The waveguide of claim 5, wherein the process further comprises controlling at least one of: a first flow rate of the first resin, a second flow rate of the second resin, a time allowed for the diffusion, a proportion of the first resin to the second resin, or a gradient of temperature across the diffusion channel.

7. The waveguide of claim 5, wherein the first resin and the second resin are selected from a group consisting of: polyacrylate, polyurethane, polysilicone, polyester, polyolefin, polyamide, and polycarbonate.

* * * * *